United States Patent
Shirasaka

(10) Patent No.: US 8,165,344 B2
(45) Date of Patent: Apr. 24, 2012

(54) IMAGE PROCESSING APPARATUS, MOVING IMAGE ENCODING APPARATUS, INFORMATION PROCESSING METHOD AND INFORMATION PROCESSING PROGRAM

(75) Inventor: Hajime Shirasaka, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1232 days.

(21) Appl. No.: 11/443,349

(22) Filed: May 31, 2006

(65) Prior Publication Data
US 2007/0009157 A1 Jan. 11, 2007

(30) Foreign Application Priority Data
May 31, 2005 (JP) .................. 2005-160004

(51) Int. Cl.
G06K 9/00 (2006.01)
G06K 9/48 (2006.01)
G06K 9/46 (2006.01)
G06K 9/66 (2006.01)
G06K 9/62 (2006.01)
G06K 9/36 (2006.01)
H04N 7/12 (2006.01)
H04N 11/02 (2006.01)
H04N 11/04 (2006.01)

(52) U.S. Cl. ........ 382/103; 382/107; 382/164; 382/165; 382/118; 382/190; 382/203; 382/224; 382/251; 382/291

(58) Field of Classification Search .......... 382/103–126, 382/155–159, 164–165, 224–225
See application file for complete search history.

(56) References Cited

U.S. PATENT DOCUMENTS
5,481,308 A * 1/1996 Hartung et al. .......... 375/240.11
(Continued)

FOREIGN PATENT DOCUMENTS
JP 2000354247 A 12/2000
(Continued)

OTHER PUBLICATIONS

Bretzner et al. ("Hand gesture recognition using multi-scale colour features, hierarchical models and particle filtering", Fifth IEEE International Conference Proceedings on Automatic Face and Gesture Recognition, 2002, pp. 423-428).*

(Continued)

Primary Examiner — Tom Y Lu
Assistant Examiner — Thomas Conway
(74) Attorney, Agent, or Firm — Sughrue Mion, PLLC

(57) ABSTRACT

The information processing apparatus comprises: an input unit which inputs moving image data of frames; a reference information acquisition unit which acquires reference information in accordance with the moving image data of one of the frames inputted to the input unit, the reference information forming a reference for identifying a constituent part of a person; a constituent part region extraction unit which extracts, in accordance with the reference information, a constituent part region where the constituent part of the person is situated, from the moving image data of each of the frames inputted after the frame from which the reference information has been acquired by the reference information acquisition unit; a priority region setting unit which sets, in accordance with the constituent part region, a priority region in the moving image data of each of the frames inputted after the frame from which the reference information has been acquired by the reference information acquisition unit; and a processing unit which carries out prescribed information processing preferentially in the priority region set by the priority region setting unit.

13 Claims, 3 Drawing Sheets

U.S. PATENT DOCUMENTS

| | | | | |
|---|---|---|---|---|
| 6,028,960 A * | 2/2000 | Graf et al. | | 382/203 |
| 6,332,033 B1 * | 12/2001 | Qian | | 382/124 |
| 6,332,038 B1 * | 12/2001 | Funayama et al. | | 382/190 |
| 6,343,141 B1 * | 1/2002 | Okada et al. | | 382/118 |
| 6,385,331 B2 * | 5/2002 | Harakawa et al. | | 382/106 |
| 6,452,970 B1 * | 9/2002 | Kaup | | 375/240.1 |
| 6,526,161 B1 * | 2/2003 | Yan | | 382/118 |
| 6,545,706 B1 * | 4/2003 | Edwards et al. | | 348/169 |
| 6,611,613 B1 * | 8/2003 | Kang et al. | | 382/118 |
| 2001/0036298 A1 * | 11/2001 | Yamada et al. | | 382/118 |
| 2004/0190776 A1 * | 9/2004 | Higaki et al. | | 382/190 |
| 2006/0125914 A1 * | 6/2006 | Sahashi | | 348/14.02 |

FOREIGN PATENT DOCUMENTS

| | | |
|---|---|---|
| JP | 2002-165222 A | 6/2002 |
| JP | 2004-303014 A | 10/2004 |
| JP | 2004350300 A | 12/2004 |
| JP | 2005109606 A | 4/2005 |

OTHER PUBLICATIONS

Imagawa et al. ("Color-based hands tracking system for sign language recognition", Proc. 3rd Int'l Conf on Face & Gesture Recognition, 1998, pp. 462-467).*

Imagawa et al., ("Color-based hands tracking system for sign language recognition", Proc. 3rd Int'l Conf on Face & Gesture Recognition, 1998, pp. 462-467).*

Tanibata et al., "Extraction of Hand Features for Recognition of Sign Language Words" (2002), International Conference on Vistion Interface, pp. 1-8.*

Hongo et al., "Face and hand gesture recognition for human-computer interaction", Proceeding, 15th International conference on Pattern Recognition, 2000, pp. 921-924.*

Japanese Patent Office, "Notice of Reasons for Rejection," issued in connection with Japanese Patent Application No. 2005-160004, dated Jul. 29, 2010.

* cited by examiner

IMAGE PROCESSING APPARATUS, MOVING IMAGE ENCODING APPARATUS, INFORMATION PROCESSING METHOD AND INFORMATION PROCESSING PROGRAM

BACKGROUND OF THE INVENTION

1. Field of the Invention

The present invention relates to technology for obtaining information forming a basis for identifying constituent parts of a person in a moving image.

2. Description of the Related Art

There exists technology for determining the motion of moving images in which the subject is a person performing sign language, or the like. For example, Japanese Patent Application Publication No. 2002-165222 discloses that, as motion is performed, depending on whether the differential between a previous frame image and a current frame image is equal to or greater than a prescribed threshold value, serial processing is carried out to divide the whole image which constitutes a freely changeable window with a movable perimeter into small rectangular-shaped blocks, by demarcating an object having the next rank of importance after the main subject. Using the motion vectors which accompany the moving images of the blocks, the position and region of the movable-perimeter window for the next frame is estimated, and the movable-perimeter window is made to follow this motion, within its potential range of change.

Japanese Patent Application Publication No. 2004-303014 discloses that a captured image analyzing device extracts skin color regions of a subject person located in a captured image, from the image captured by a reference camera (captured image). More specifically, the RGB (red, green and blue) values of all of the pixels in the captured image are converted into values in the HLS (hue, luminosity and saturation) space, and pixels having values for the hue, luminosity and saturation within previously established threshold values are extracted as skin color regions. An outline extraction device extracts the outline of the subject person. A gesture recognition device then determines the facial position and the finger tip positions of the subject person in the actual space, on the basis of the outline information and skin color region information relating to the subject person.

In the technology in Japanese Patent Application Publication No. 2002-165222, since the positions of the hands are estimated by means of the motion vectors, the motion of an object that is unrelated to the subject person may be followed mistakenly. Furthermore, the skin color of people varies between different individuals, and therefore, it is not necessarily possible always to accurately determine the skin color of subject's hands within a universal skin color threshold value range as in the technology described in Japanese Patent Application Publication No. 2004-303014.

SUMMARY OF THE INVENTION

The present invention has been contrived in view of these circumstances, an object thereof being to make it possible to identify the constituent parts of a particular person in a moving image.

In order to attain the aforementioned object, the present invention is directed to an information processing apparatus, comprising: an input unit which inputs moving image data of frames; a reference information acquisition unit which acquires reference information in accordance with the moving image data of one of the frames inputted to the input unit, the reference information forming a reference for identifying a constituent part of a person; a constituent part region extraction unit which extracts, in accordance with the reference information, a constituent part region where the constituent part of the person is situated, from the moving image data of each of the frames inputted after the frame from which the reference information has been acquired by the reference information acquisition unit; a priority region setting unit which sets, in accordance with the constituent part region, a priority region in the moving image data of each of the frames inputted after the frame from which the reference information has been acquired by the reference information acquisition unit; and a processing unit which carries out prescribed information processing preferentially in the priority region set by the priority region setting unit.

According to the present invention, the reference information relating to a particular person is acquired from a certain frame moving image. If the reference information relating to the person can be acquired, then the constituent parts of the person in the frame moving image after this frame moving image, for example, the positions of the hands and the face, can be followed accurately. By setting the region in which processing is carried out preferentially on the basis of the regions where the extracted constituent components of the person are located, then it is possible to perform various types of information processing preferentially in the important regions where the constituent parts of the person are located.

Preferably, the information processing apparatus further comprises: a face determination unit which determines a face region of the person from the moving image data of one of the frames inputted to the input unit, wherein the reference information acquisition unit acquires the reference information from the face region of the person determined by the face determination unit.

Preferably, the reference information acquisition unit acquires color information of the face region of the person as the reference information.

According to this aspect of the present invention, information on the skin color can be acquired for each person.

Preferably, the face determination unit determines at least one of regions of eyes, mouth and nose of the person from the moving image data of one of the frames inputted to the input unit; and the reference information acquisition unit acquires the color information from a part of the face region excluding the at least one of the regions of eyes, mouth and nose of the person, as the reference information.

According to this aspect of the present invention, it is possible to acquire the information on the skin color of the person, as accurately as possible.

The concept of reference information may include a color range specified in accordance with the color information acquired by the reference information acquisition unit. For example, the reference information can be set as a color range specified by upper and lower limits for the hue, luminosity and saturation in the face region. Alternatively, it is also possible to set the reference information as a prescribed error range with reference to the average value of the color information of the pixels in the face region.

Preferably, the constituent part region extraction unit extracts a pixel region having color information falling within the specified color range, as the constituent part region.

Preferably, the priority region setting unit sets a region containing the constituent part region as the priority region.

The priority region may have any size or shape, but provided that at least a region containing the constituent part regions is set as the priority region, then desirably, the range of motion of the face and hands of the person should covered by the priority region.

Preferably, the information processing apparatus further comprises: a position determination unit which determines at least one of positions of eyes, mouth and nose of the person from the moving image data of one of the frames inputted to the input unit, wherein the priority region setting unit sets the priority region in accordance with the at least one of the positions of eyes, mouth and nose of the person.

In order to attain the aforementioned object, the present invention is also directed to a moving image encoding apparatus, comprising: an input unit which inputs moving image data of frames; a compression unit which compresses the moving image data of the frames inputted to the input unit; a quantization unit which quantizes the moving image data of the frames compressed by the compression unit; an output unit which outputs the moving image data of the frames quantized by the quantization unit; a reference information acquisition unit which acquires reference information in accordance with the moving image data of one of the frames inputted to the input unit, the reference information forming a reference for identifying a constituent part of a person; a constituent part region extraction unit which extracts, in accordance with the reference information, a constituent part region where the constituent part of the person is situated, from the moving image data of each of the frames inputted after the frame from which the reference information has been acquired by the reference information acquisition unit; and a high-level quantization region setting unit which sets, in accordance with the constituent part region, a high-level quantization region in the moving image data of each of the frames inputted after the frame from which the reference information has been acquired by the reference information acquisition unit, wherein the quantization unit adjusts an adaptive level of quantization to become finer in a block of the high-level quantization region.

If the reference information relating to a particular person can be acquired from a certain frame moving image, then the constituent parts of the person in the frame moving image after this frame moving image, for example, the positions of the hands and the face, can be followed accurately. By setting a region in which the adaptive level of the quantization is made finer on the basis of the region where the constituent parts of the person thus extracted are located, then it is possible to raise, preferentially, the image quality in the important regions where the constituent parts of the person are located.

In order to attain the aforementioned object, the present invention is also directed to an information processing method, comprising: an input step of inputting moving image data of frames; a reference information acquisition step of acquiring reference information in accordance with the moving image data of one of the frames inputted in the input step, the reference information forming a reference for identifying a constituent part of a person; a constituent part region extraction step of extracting, in accordance with the reference information, a constituent part region where the constituent part of the person is situated, from the moving image data of each of the frames inputted after the frame from which the reference information has been acquired in the reference information acquisition step; a priority region setting step of setting, in accordance with the constituent part region, a priority region in the moving image data of each of the frames inputted after the frame from which the reference information has been acquired in the reference information acquisition step; and a processing step of carrying out prescribed information processing preferentially in the priority region set in the priority region setting step.

In order to attain the aforementioned object, the present invention is also directed to a computer readable medium having embodied thereon a program for performing information processing by a computer, the program comprising: a first code segment for an input step of inputting moving image data of frames; a second code segment for a reference information acquisition step of acquiring reference information in accordance with the moving image data of one of the frames inputted in the input step, the reference information forming a reference for identifying a constituent part of a person; a third code segment for a constituent part region extraction step of extracting, in accordance with the reference information, a constituent part region where the constituent part of the person is situated, from the moving image data of each of the frames inputted after the frame from which the reference information has been acquired in the reference information acquisition step; a fourth code segment for a priority region setting step of setting, in accordance with the constituent part region, a priority region in the moving image data of each of the frames inputted after the frame from which the reference information has been acquired in the reference information acquisition step; and a fifth code segment for a processing step of carrying out prescribed information processing preferentially in the priority region set in the priority region setting step.

According to the present invention, if the reference information relating to a particular person can be acquired from a certain frame moving image, then the constituent parts of the person in the frame moving image after this frame moving image, for example, the positions of the hands and the face, can be followed accurately. By setting the region in which processing is carried out preferentially on the basis of the regions where the extracted constituent components of the person are located, then it is possible to perform various types of information processing, preferentially, in the important regions where the constituent parts of the person are located.

By setting a region in which the adaptive level of the quantization is made finer on the basis of the region where the constituent parts of the person thus extracted are located, then it is possible to raise the image quality preferentially in the important regions where the constituent parts of the person are located.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Figure 1:
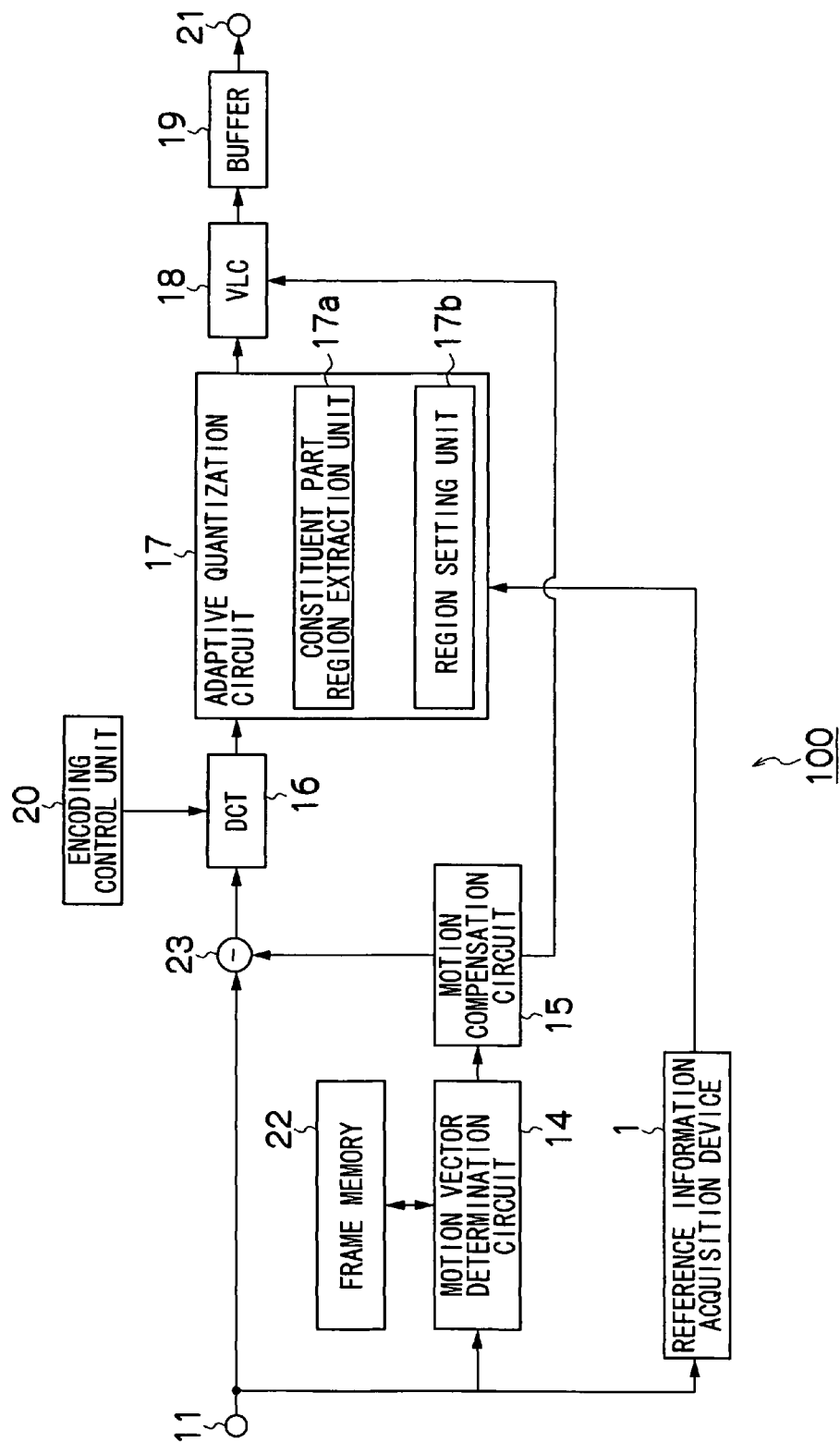
FIG. 1 is a block diagram of an encoding apparatus according to an embodiment of the present invention.

FIG. 1 is a block diagram of an encoding apparatus 100, which incorporates a reference information acquisition device 1 according to a preferred embodiment of the present invention. The encoding apparatus 100 comprises: an image input unit 11, a motion vector determination circuit 14, a motion compensation circuit 15, a discrete cosine transformation (DCT) unit 16, an adaptive quantization circuit 17, a variable length coding (VLC) unit 18, an encoding control unit 20, a buffer 19, a data transmission unit 21, and the like. The encoding apparatus 100 includes part of the composition of an MPEG-2 encoding apparatus, which combines motion compensation predictive encoding, and compressed encoding by DCT.

The image input unit 11 inputs a moving picture signal from an image capturing apparatus comprising an imaging elements, such as a CCD (charge-coupled device) (not shown).

The motion vector determination circuit 14 determines the motion vector by comparing the current frame image, which is represented by the data inputted from the image input unit 11, with the previous frame image, which is stored in the frame memory 22. The motion vector is determined by dividing the current frame image that has been inputted, into a plurality of macro blocks, and, taking the individual macro blocks as units, repeating an error calculation while moving the searched macro blocks appropriately within search ranges which are set on the previous frame image, thereby identifying the macro block that is most similar to the searched macro block (namely, the macro block having the minimum error), within the search range, and taking the motion vector relating to the searched macro block to be the amount of displacement and the direction of distortion between the most similar macro block and the searched macro block. By synthesizing the motion vectors determined for the macro blocks, while taking account of the error in each macro block, it is possible to find the motion vector that produces a minimum predictive differential in the predictive encoding.

The motion compensation circuit 15 generates predictive image data by performing motion compensation with respect to the predictive reference image, on the basis of the determined motion vector, and it outputs this data to a subtractor 23. The subtractor 23 generates differential data that represents the predictive differential, by subtracting the predictive image represented by the data inputted from the motion compensation circuit 15, from the current frame image represented by the data inputted from the input image unit 11.

The subtractor 23 is connected sequentially to the DCT unit 16, the adaptive quantization circuit 17, the VLC unit 18, and the buffer 19. The DCT unit 16 performs orthogonal transformation of the differential data for each block inputted from the subtractor 23, and outputs the transformed data. The adaptive quantization circuit 17 quantizes the orthogonally-transformed differential data inputted from the DCT unit 16, by means of a prescribed quantization step, and then outputs the quantized data to the VLC unit 18. Furthermore, the VLC unit 18 is also connected with the motion compensation circuit 15, and the motion vector data is also inputted from the motion compensation circuit 15. The VLC unit 18 encodes the differential data that has been orthogonally transformed and quantized, by means of two-dimensional Huffman coding, and the VLC unit 18 also encodes the inputted motion vector data, by Huffman coding, mutually superimposes the two sets of encoded data, and outputs them as encoded moving image data. The encoded moving image data is accumulated in the buffer 19, and is transmitted in the form of compressed image information in packets from the data transmission unit 21 to a network, such as the Internet.

When the adaptive quantization circuit 17 performs the quantization by dividing the picture into a plurality of blocks, the adaptive quantization circuit 17 carries out adaptive quantization processing in which the quantization steps are adapted in block units, in accordance with the characteristic quantities in the blocks.

Figure 2:
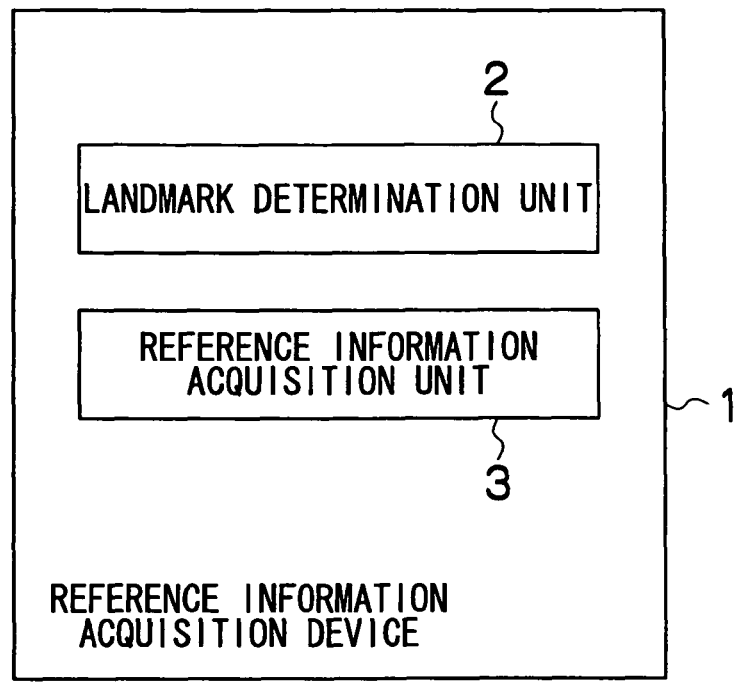
FIG. 2 is a block diagram of a reference information acquisition device.

FIG. 2 is a block diagram showing the detailed composition of the reference information acquisition device 1 according to the present embodiment. The reference information acquisition device 1 comprises: a landmark determination unit 2, which determines landmarks indicating the characteristic quantities (namely, the position, shape and size) of the constituent parts of a subject person, from a particular input frame image; and a reference information acquisition unit 3, which sets a reference region on the basis of the landmarks determined by the landmark determination unit 2, and acquires reference information contained within the reference region thus set.

Various types of technology may be used for landmark determination by the landmark determination unit 2.

Figure 3:
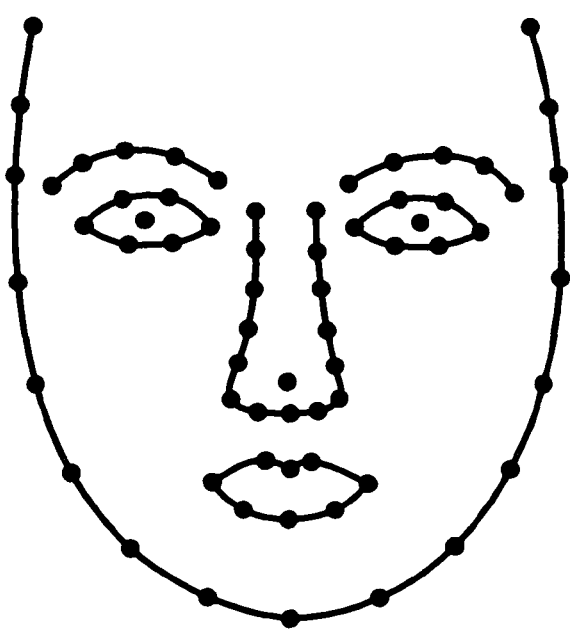
FIG. 3 is a diagram showing an embodiment of landmarks.

FIG. 3 shows the landmarks in the form of dots, these landmarks indicating the position, shape and size of the outlines of the eyes, mouth, and nose, which are examples of constituent parts of a person, as determined by the landmark determination unit 2 from an image including the person's face.

A reference region set by the reference information acquisition unit 3 is set on the basis of the positions of the landmarks, but there are no particular restrictions on the way that this reference region should be set.

Figure 4:
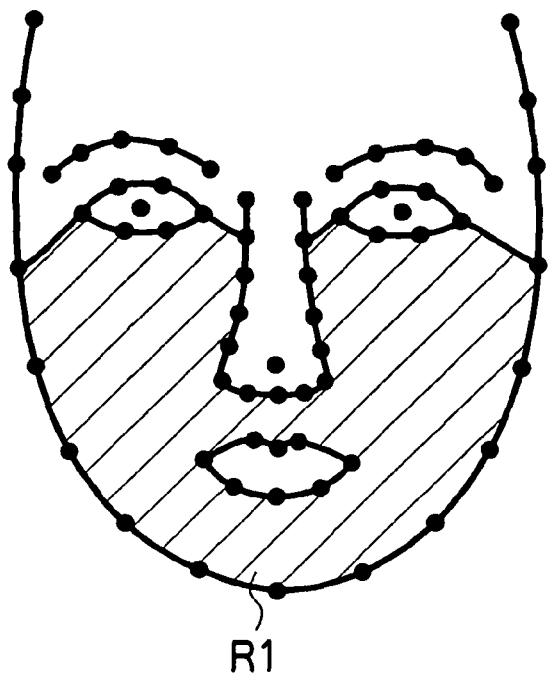
FIG. 4 is a diagram showing an embodiment of a reference region.

FIG. 4 shows an embodiment in which a region R1 is set as the reference region, which is surrounded by the face outline landmark and situated below the position of the eye landmarks, and excludes the regions surrounded by the nose and mouth landmarks. The eyes, nose and mouth are excluded in order that the information on the skin color of the particular subject person can be acquired as accurately as possible.

The reference information acquisition unit 3 extracts reference information from the reference region. The reference information forms a reference for identifying the constituent parts of a person, and desirably, it is specified on the basis of the color information of the respective pixels in the reference region. For example, the reference information can be set as a color range specified by upper and lower limits for the hue, luminosity and saturation of the pixels in the reference region. Alternatively, the reference information may be set as a prescribed error range with reference to the average value of the color information of the pixels in the reference region. Below, reference information which specifies a color range in this way is specifically called a "reference color range".

The reference information can be acquired for any frame image and it may be acquired from each of the input frame images, or it may be acquired from particular frame images (e.g., the frame images inputted at prescribed time intervals).

Looking again at FIG. 1, the adaptive quantization circuit 17 comprises a constituent part region extraction unit 17a and a region setting unit 17b. The constituent part region extraction unit 17a extracts constituent part regions where the constituent parts of the subject person are located, from the frame images (from the subsequent frame images, or from the frame images separated at prescribed time intervals) after the frame image from which the reference information acquisition device has acquired the reference information, on the basis of the acquired reference information. The region setting unit 17b sets a priority region, where prescribed information processing is preferentially carried out, more specifically, where the adaptive level of the quantization is to be made finer (hereinafter, called "high-level quantization region"), in each of the subsequent frame images, on the basis of the constituent part regions.

The constituent part region may be set to any region that can be found using the reference information as a parameter, but desirably, it is set as a pixel region having the color information contained within the reference color range.

The priority region may be set to any region that can be specified by using the position, shape, size, and the like, of the constituent part regions as parameters, but desirably, it is set to a region that encompasses the constituent part regions.

Figure 5:
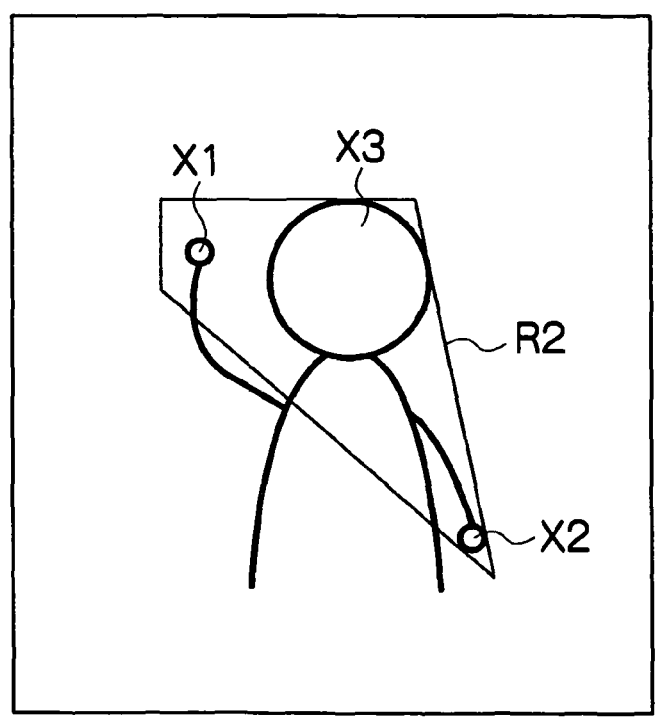
FIG. 5 is a diagram showing an embodiment of a high-level quantization region set in the image.

For example, if the reference color range is acquired from the region R1 of the face region of a certain subject person, then it can be regarded that the skin color of the subject person's hands falls within the reference color range. Therefore, as shown in FIG. 5, the pixel regions having color information falling within the reference color range are taken to be the constituent part regions X1 (right hand region), X2 (left hand region) and X3 (face region), and a polygonal region R2 of minimum surface area that encompasses all of the constituent part regions X1, X2 and X3 is set to be the priority region or the high-level quantization region, so that the face region and the two hand regions of the subject person are contained within the region R2. The shape of the region R2 is not limited in particular and it may be a circular region, or the like. The positions of the constituent part regions X1, X2 and X3 vary between the frame images, but since the region R2 is specified for each frame, then the shape of the region R2 changes to follow the positions of the constituent part regions X1, X2 and X3 in each frame.

In the frame image in which the reference information is acquired, it is possible to extract the constituent part region X3 corresponding to the face region, on the basis of the landmark positions. It is also possible to estimate the range of motion of the constituent part regions X1 (right hand region) and X2 (left hand region) in accordance with the positions, shapes and sizes of the landmarks, and to set this range of motion as the priority region.

It is also possible to arrange the region setting unit 17a in the reference information acquisition device 1. It is also possible to preferentially perform the prescribed information processing (for example, various image processing such as edge processing), only in the priority region set in the frame image.

The adaptive quantization circuit 17 adjusts the adaptive level of the quantization process (quantization scale) to become finer in the block of the high-level quantization region set by the region setting unit 17b, thereby making degradation in the image quality due to the image encoding less conspicuous in the high-level quantization region. On the other hand, the adaptive quantization circuit 17 adjusts the adaptive level of the quantization process to become coarser in the blocks other the block of the high-level quantization region. Thus, it is possible to reduce the data volume at the same time as maintaining the image quality in the required regions.

The encoding apparatus 100 is particularly valuable for conversations based on sign language between people with hearing difficulties, through a video telephone system. For example, if the high-level quantization region R2 shown in FIG. 5 is established, then although the facial expression and the hand positions are constantly changing, they can be verified easily by means of the high-quality region R2 following their motion. Moreover, since the data volume relating to the regions other than the region R2, which are not so important for sign language conversations, can be reduced, then it is possible to prevent the occurrence of delay due to the transfer of unnecessary data, thus helping to achieve a smooth sign language conversation.

As described above, the reference information acquisition device 1 according to the present invention determines reference information that is subtly different for subject persons, rather than being a uniform skin color region as in the related art, from the certain input frame image, and the region setting unit 17b according to the present invention sets a priority region on the basis of the reference information, rather than a motion vector. Thus, the priority region does not follow objects that are not related to the subject person, and it is possible to accurately and precisely follow the regions where the constituent parts of the subject person are located.

The functions of the reference information acquisition device 1 and/or the encoding apparatus 100 described in the present embodiment can be realized by a program control performed by a computer (calculation apparatus), and the control method and the control program are also included in the present invention.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. An information processing apparatus, comprising:
    an input unit which inputs moving image data of frames;
    a detect unit which detects a face region of a person from the moving image data of frames inputted to the input unit;
    a reference information acquisition unit which acquires reference information in accordance with the face region of the person detected by the detect unit, the reference information forming a reference for identifying a constituent part including a person's face and a hand;
    a constituent part region extraction unit which extracts, in accordance with the reference information, a constituent part region where the constituent part including the person's face and the hand are situated, from the moving image data of each of the frames inputted after the frame from which the reference information has been acquired by the reference information acquisition unit;
    a priority region setting unit which includes the constituent part region including the person's face and the hand extracted from the constituent part region extraction unit, and sets a priority region that is a region that carries out prescribed information processing preferentially, as the moving image data of each of the frames inputted after the frame from which the reference information has been acquired by the reference information acquisition unit;
    a processing unit which carries out the prescribed information processing preferentially in the priority region set by the priority region setting unit,
    wherein the priority region is a single region comprising the constituent part region including the person's face and the hand.

2. The information processing apparatus as defined in claim 1, further comprising:
    a position determination unit which determines at least one of positions of eyes, mouth and nose of the person from the moving image data of one of the frames inputted to the input unit,
    wherein the priority region setting unit sets the priority region in accordance with the at least one of the positions of eyes, mouth and nose of the person.

3. The apparatus of claim 1 wherein the information processing comprises edge enhancement.

4. The apparatus of claim 1, wherein the priority region includes a face region and a hand region.

5. The apparatus of claim 1, wherein the constituent part region includes right and left hands of the person.

6. The apparatus of claim 1, wherein the processing unit adjusts an adaptive level of quantization with respect to the block of the priority region to be finer.

7. The apparatus of claim 6, wherein the processing unit adjusts an adaptive level of quantization with respect to the block of other than the priority region to be rougher, quantizes the moving image data of frames in a quantization step in accordance with the adaptive level of quantization with respect to the block of the priority region and block of other than the priority region, and transfer the data as sign language conversation data of video telephone system.

8. The information processing apparatus as defined in claim 1, wherein the reference information acquisition unit acquires color information of the face region of the person as the reference information.

9. The information processing apparatus as defined in claim 8, wherein:
the face determination unit determines at least one of regions of eyes, mouth and nose of the person from the moving image data of one of the frames inputted to the input unit; and
the reference information acquisition unit acquires the color information from a part of the face region excluding the at least one of the regions of eyes, mouth and nose of the person, as the reference information.

10. The information processing apparatus as defined in claim 8, wherein the reference information includes a color range specified in accordance with the color information acquired by the reference information acquisition unit.

11. The information processing apparatus as defined in claim 10, wherein the constituent part region extraction unit extracts a pixel region having color information falling within the specified color range, as the constituent part region.

12. An information processing method, comprising:
an input step of inputting moving image data of frames;
a detect step of detecting a face region of a person from the moving image data of frames inputted to the input unit;
a reference information acquisition step of acquiring reference information in accordance with the face region of the person detected, the reference information forming a reference for identifying a constituent part including a person's face and a hand;
a constituent part region extraction step of extracting, in accordance with the reference information, a constituent part region where the constituent part of the person's face and the hand are situated, from the moving image data of each of the frames inputted after the frame from which the reference information has been acquired in the reference information acquisition step;
a priority region setting step of including a constituent part region including the constituent part of the person's face and the hand extracted from the constituent part region extraction unit, and setting a priority region which is a region carrying out prescribed information processing preferentially as the moving image data of each of the frames inputted after the frame from which the reference information has been acquired in the reference information acquisition step; and
a processing step of carrying out prescribed information processing preferentially in the priority region set in the priority region setting step,
wherein the priority region is a single region comprising the constituent part region including the person's face and the hand.

13. A non-transitory computer-readable medium for performing information processing by a computer, the program comprising:
an input step of inputting moving image data of frames;
a detect step of detecting a face region of a person from the moving image data of frames inputted to the input unit;
a reference information acquisition step of acquiring reference information in accordance with a face region of a person detected, the reference information forming a reference for identifying a constituent part including a person's face and a hand,
a constituent part region extraction step of extracting, in accordance with the reference information, a constituent part region where the constituent part of the person's face and the hand are situated, from the moving image data of each of the frames inputted after the frame from which the reference information has been acquired in the reference information acquisition step;
a priority region setting step of including a constituent part region including the constituent part of the person's face and the hand extracted from the constituent part region extraction unit, and setting a priority region which is a region carrying out prescribed information processing preferentially as the moving image data of each of the frames inputted after the frame from which the reference information has been acquired in the reference information acquisition step; and
a processing step of carrying out prescribed information processing preferentially in the priority region set in the priority region setting step,
wherein the priority region is a single region comprising the constituent part region including the person's face and the hand.

* * * * *